(12) United States Patent
Kikuyama et al.

(10) Patent No.: US 6,955,795 B2
(45) Date of Patent: Oct. 18, 2005

(54) METHOD FOR PRODUCING LITHIUM HEXAFLUOROPHOSPHATE

(75) Inventors: Hirohisa Kikuyama, Osaka (JP); Toshirou Fukudome, Osaka (JP); Masahide Waki, Osaka (JP); Tomoyuki Deguchi, Osaka (JP)

(73) Assignee: Stella Chemifa Kabushiki Kaisha, Osaka (JP)

( * ) Notice: Subject to any disclaimer, the term of this patent is extended or adjusted under 35 U.S.C. 154(b) by 217 days.

(21) Appl. No.: 10/149,266

(22) PCT Filed: Dec. 11, 2000

(86) PCT No.: PCT/JP00/08737

§ 371 (c)(1),
(2), (4) Date: Sep. 25, 2002

(87) PCT Pub. No.: WO01/42133

PCT Pub. Date: Jun. 14, 2001

(65) Prior Publication Data

US 2003/0077215 A1 Apr. 24, 2003

(30) Foreign Application Priority Data

Dec. 9, 1999 (JP) .......... 11/350838

(51) Int. Cl.⁷ .......... C01B 25/10
(52) U.S. Cl. .......... 423/301
(58) Field of Search .......... 423/301

(56) References Cited

U.S. PATENT DOCUMENTS 3,607,020 A * 9/1971 Smith, Jr. .......... 423/301
6,514,474 B1 * 2/2003 Kikuyama et al. .......... 423/301

FOREIGN PATENT DOCUMENTS

| JP | 6-298507 | * 10/1994 | .......... 423/301 |
| JP | 06298507 A | 10/1994 | .......... C01B/25/455 |
| JP | 10092468 A | 4/1998 | .......... H01M/10/40 |
| JP | 11147705 A | 6/1999 | .......... C01B/25/455 |

* cited by examiner

Primary Examiner—Wayne A. Langel
(74) Attorney, Agent, or Firm—Randall J. Knuth

(57) ABSTRACT

In order to provide a method for producing lithium hexafluorophosphate capable of producing lithium hexafluorophosphate of a higher purity than in the related art without the necessity for after-treatment for removal of impurities, a method is characterized by filtering lithium hexafluorophosphate coexisting with a solvent and then carrying out after-filtering drying in a gas atmosphere containing $PF_5$.

10 Claims, 2 Drawing Sheets

METHOD FOR PRODUCING LITHIUM HEXAFLUOROPHOSPHATE

BACKGROUND OF THE INVENTION

1. Field of the Invention

The present invention relates to a method for producing lithium hexafluorophosphate, and specifically relates to a method for producing lithium hexafluorophosphate useful as an electrolyte for lithium secondary batteries and a catalyst for organic synthesis.

2. Description of the Related Art

Conventionally, lithium hexafluorophosphate is produced by the following steps:

1) Lithium fluoride (LiF) is dissolved in hydrofluoric acid anhydride to give a solution.

2) $PF_5$ gas is blown into this solution. This operation causes LiF to react with $PF_5$ to produce lithium hexafluorophosphate.

3) The solution is cooled to deposit lithium hexafluorophosphate.

4) The solution is filtered to separate the deposited lithium hexafluorophosphate.

5) The separated lithium hexafluorophosphate is then dried to yield lithium hexafluorophosphate as a product.

6) Following this step, a product of lithium hexafluorophosphate is dissolved in an organic solvent, for example, to for use as an electrolyte for a lithium battery.

However, according to the conventional related method for producing lithium hexafluorophosphate, many kinds of impurities such as lithium fluoride and oxyfluoride acid compound are contained in hexafluorophosphate.

When lithium hexafluorophosphate containing such impurities is dissolved in an organic solvent for use as an electrolyte for a lithium battery, lithium fluoride contaminate is not soluble in the organic solvent, thereby requiring filtering of the electrolyte.

Examples of methods for removing these impurities are a method using an ion exchange resin where lithium hexafluorophosphate is dissolved in organic solvent to remove impurities (Japanese Published Unexamined Patent Application No. 1984-87774) and a method where neutralization treatment is carried out in an organic solvent (1984-81870.) However, these methods are complex in operation and provide low productivity.

As described above, related methods for producing lithium hexafluorophosphate require complex after-treatment. Even if after-treatment is performed, lithium hexafluorophosphate of high purity cannot be produced, which is problematic.

SUMMARY OF THE INVENTION

The present invention provides a method for producing lithium hexafluorophosphate capable of yielding lithium hexafluorophosphate of high purity without after-treatment. The method for producing lithium hexafluorophosphate according to the present invention is characterized by filtering lithium hexafluorophosphate coexisting with the solvent and then drying after filtering in a gas atmosphere containing $PF_5$.

Organic solvents that may be used as the solvent are solvents that do not react with hydrofluoric acid anhydride or lithium hexafluorophosphate.

A state where lithium hexafluorophosphate coexists with the solvent is a state in which, the following steps are completed:

1) Lithium fluoride (LiF) is dissolved in hydrofluoric acid anhydride to give a solution.

2) $PF_5$ gas is blown into this solution. This operation causes LiF and $PF_5$ to react to produce lithium hexafluorophosphate.

3) The solution is cooled to deposit lithium hexafluorophosphate.

In the present invention, the step of filtering the solution is performed in a gas atmosphere containing $PF_5$.

Gases that may be employed as the gas containing $PF_5$ (atmosphere gas, hereafter) are gases that are prepared by diluting $PF_5$ with a gas (for example, HF gas, HCl gas, nitrogen gas, argon gas, helium gas, xenon gas, dried air, a gas that does not react with $PF_5$ or lithium hexafluorophosphate.)

The concentration of $PF_5$ in the atmosphere gas is preferably 1 to 50 mol %, with 1 to 20 mol % being more preferable, and 1 to 10 mol % being still more preferable. A concentration less than 1 mol % may result in the effects being insufficient. A concentration of over 50 mol % causes an increase in $PF_5$ consumption and is therefore expensive.

On the other hand, 0.003 to 0.3 kg of $PF_5$ is preferable for 1 kg of lithium hexafluorophosphate, with of 0.003 to 0.03 kg of $PF_5$ being more preferable. Less than 0.003 kg of $PF_5$ may not cause effects that are sufficient. An amount over 0.3 kg causes an increase in $PF_5$ consumption which is expensive.

Meanwhile, the concentration of impurities, particularly moisture, contained in the atmosphere gas is preferably 100 ppb (parts per billion) or smaller, more preferably 10 ppb or smaller, and still more preferably 1 ppb or smaller. Such control brings about a yield of lithium hexafluorophosphate of high purity.

The pressure of the atmosphere gas may be normal pressure. The temperature may also be normal.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Embodiment 1 of the Present Invention

Figure 1:
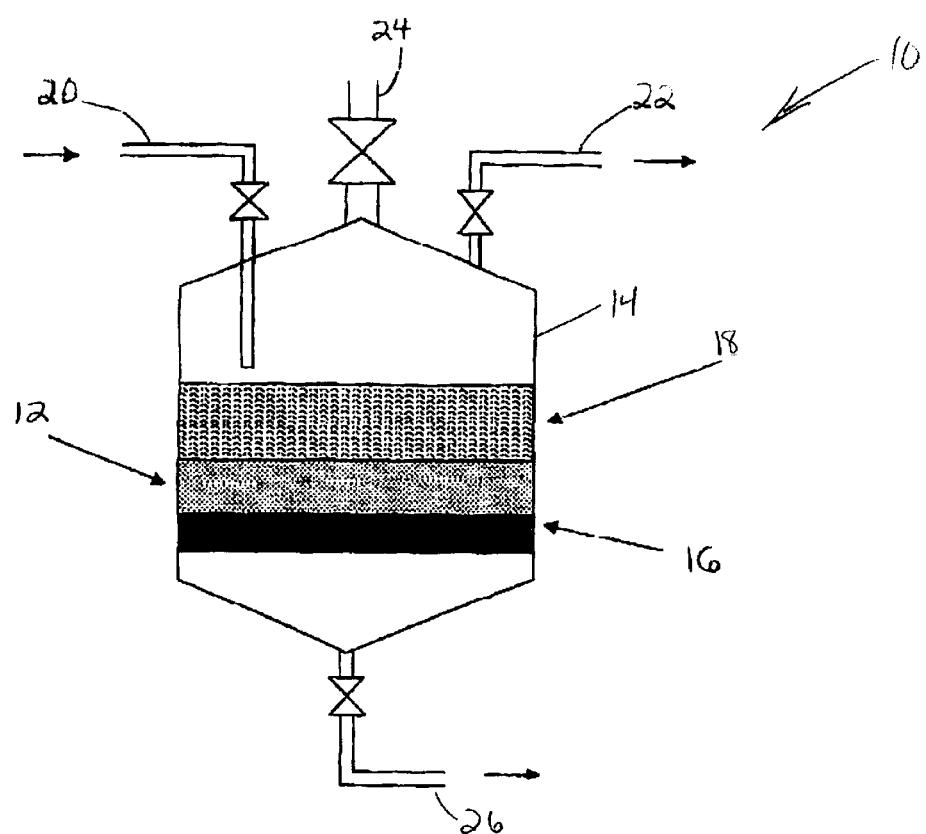
FIG. 1 is a conceptual diagram of the filtering apparatus used in the present invention.

Hydrofluoric acid anhydride solution containing 22% lithium hexafluorophosphate was cooled at −20° C. to deposit crystals of lithium hexafluorophosphate.

Next, this slurry was transferred to a filtering apparatus (20 L (liter) volume) with inlet and outlet orifices for the flow of the atmosphere gas. The slurry was filtered for 10 minutes in a flow of an atmosphere gas consisting of 3 mol % of $PF_5$ and 97 mol % of nitrogen at a flow rate of 15

L/min., dried in the same atmosphere gas at room temperature for 25 min., and finally heated at 105° C. overnight (for example, about 6 to 8 hours).

The amount of the lithium hexafluorophosphate crystal yielded was 11.3 kg and impurities were 50 ppm in HF and 70 ppm in LiF.

The amount of $PF_5$ used was 0.008 kg per 1 kg of lithium hexafluorophosphate.

COMPARATIVE EXAMPLE

Hydrofluoric acid anhydride solution containing 22% lithium hexafluorophosphate was cooled at −20° C. to deposit a crystalline form of lithium hexafluorophosphate.

Next, this slurry was transferred to the filtering apparatus (20 L (liter) volume) with inlet and outlet orifices for the atmosphere gas. The slurry was filtered for 10 minutes in the flowing atmosphere gas. The atmosphere gas consisted exclusively of nitrogen and was fed at a flow rate of 15 L/min. The slurry was then dried in the atmosphere gas at room temperature for 25 min., and finally heated at 105° C. overnight.

The amount of the lithium hexafluorophosphate crystal yielded was 11.1 kg and impurities were 58 ppm in HF and 930 ppm in LiF.

The slurry decomposed during filtering and drying, resulting in an increase in LiF as an impurity.

Embodiment 2

Hydrofluoric acid anhydride solution containing 22% of lithium hexafluorophosphate was cooled at −20° C. to deposit a crystalline form of lithium hexafluorophosphate.

Next, this slurry was transferred to the filtering apparatus (100 L (liter) volume) with inlet and outlet orifices for the atmosphere gas. The slurry is filtered for 60 minutes with the atmosphere gas consisting of 15 mol % of $PF_5$ and 85 mol % of nitrogen flowing thereover at a flow rate of 12 L/min., dried in the same atmosphere gas at room temperature for 30 min., and further dried for 90 min. in the flow of an atmosphere gas consisting of 5 mol % of $PF_5$ and 95 mol % of nitrogen at a 35 L/min. flow rate, and finally heated at 105° C. overnight.

The amount of the lithium hexafluorophosphate crystal yielded was 57 kg and impurities were 52 ppm in HF and 90 ppm in LiF.

The amount of $PF_5$ used was 0.022 kg per 1 kg of lithium hexafluorophosphate.

COMPARATIVE EXAMPLE 2

Hydrofluoric acid anhydride solution containing 22% lithium hexafluorophosphate was cooled at −20° C. to deposit a crystalline form of lithium hexafluorophosphate.

Next, this slurry was transferred to filtering apparatus (100 L (liter) volume) with inlet and outlet orifices for the atmosphere gas. The slurry was filtered for 60 minutes in the flow of the atmosphere gas. The atmosphere gas consisted exclusively of nitrogen at a flow rate of 12 L/min. Then the slurry was dried in the atmosphere gas at room temperature for 30 min., and finally heated at 105° C. overnight.

The amount of the lithium hexafluorophosphate crystal yielded was 54 kg and impurities were 54 ppm in HF and 1190 ppm in LiF.

The slurry decomposed during filtering and drying, resulting in an increase in LiF as an impurity.

A filtering apparatus 10, used in performing the method of the present invention, is shown in FIG. 1. Filtering apparatus 10 for treating lithium hexafluorophosphate crystals 12 includes a filter housing 14, a filter plate 16, a solvent 18, an atmospheric gas inlet 2, an exhaust gas outlet 22, a crystal outlet orifice 24, and a filtrate outlet 26.

Figure 2:
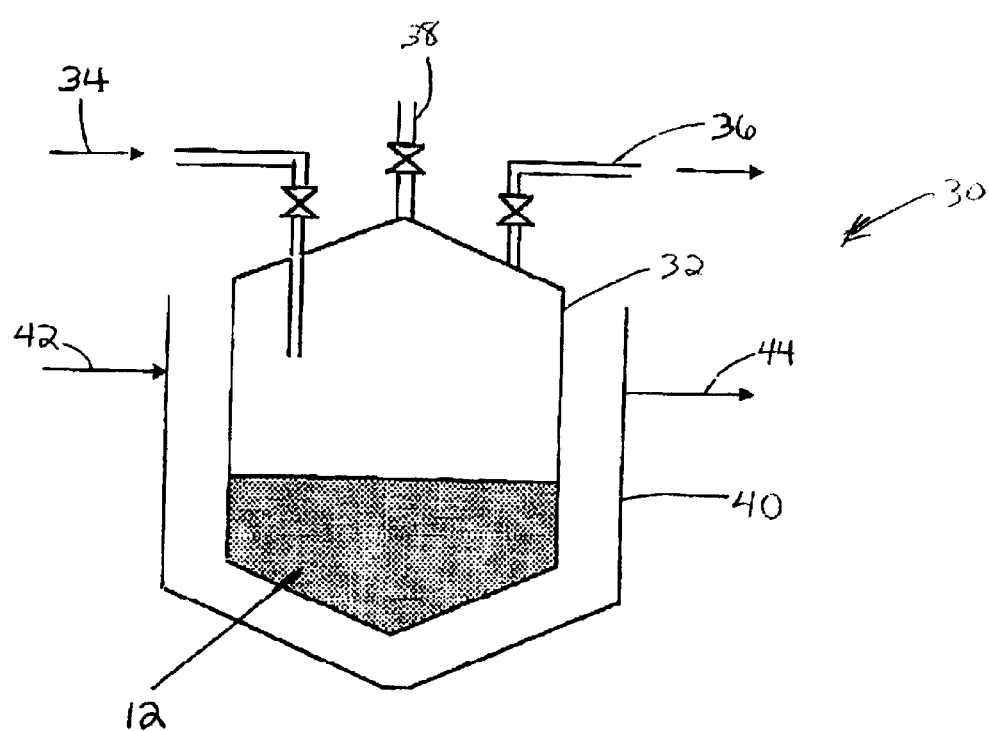
FIG. 2 is a conceptual diagram of the drying apparatus used in the present invention.

A drying apparatus 30, used in performing the method of the present invention is shown in FIG. 2. Drying apparatus 30 for drying lithium hexafluorophosphate crystals 12 includes a dryer housing 32, an atmospheric gas inlet 34, an exhaust gas outlet 36, a crystal outlet orifice 38, a heating vessel 40, a heating medium inlet 42, and a heating medium outlet 44.

INDUSTRIAL APPLICABILITY

According to the present invention without aftertreatment, lithium hexafluorophosphate of a higher purity than that produced conventionally can be yielded.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for producing lithium hexafluorophosphate, said method comprising the steps of:
   providing lithium hexafluorophosphate in a solvent;
   providing a treatment gas atmosphere, said treatment gas atmosphere containing $PF_5$;
   filtering said lithium hexafluorophosphate in the presence of said treatment gas atmosphere; and
   carrying out post-filtering drying of said lithium hexafluorophosphate in the presence of said treatment gas atmosphere;
   wherein a concentration of $PF_5$ in said gas is in the range of 1 mol % to 50 mol %.

2. The method of claim 1, wherein $PF_5$ is present in a ratio of 0.003 KG to 0.3 KG per 1 KG of lithium hexafluorophosphate.

3. The method of claim 2, wherein the ratio is 0.003 KG to 0.03 KG per 1 KG of lithium hexafluorophosphate.

4. The method of claim 1, wherein a maximum concentration of impurities contained in said treatment gas atmosphere is 100 parts per billion (ppb).

5. The method of claim 4, wherein the maximum concentration of impurities is 10 ppb.

6. The method of claim 4, wherein the impurities include moisture.

7. The method of claim 1, wherein said treatment gas atmosphere is selected from the group consisting of HF gas, HCl gas, nitrogen gas, argon gas, helium gas, xenon gas, dried air, a gas that does not react with $PF_5$ and lithium hexafluorophosphate, and any combination thereof.

8. The method of claim 1, further comprising a step of heating said lithium hexafluorophosphate to 105° C. for a period of 6 hours to 8 hours after carrying out said post-filtering drying.

9. The method of claim 8, wherein said lithium hexafluorophosphate is heated to 105° C. for a period of 6 hours to 8 hours.

10. A method for producing lithium hexafluorophosphate, said method comprising the steps of:

providing lithium hexafluorophosphate in a solvent;

providing a treatment gas atmosphere, said treatment gas atmosphere containing $PF_5$;

filtering said lithium hexafluorophosphate in the presence of said treatment gas atmosphere; and carrying out post-filtering drying of said lithium hexafluorophosphate in the presence of said treatment gas atmosphere;

wherein a concentration of $PF_5$ in said gas atmosphere is in the range of 1 mol % to 10 mol %.

* * * * *